United States Patent
Ho et al.

(10) Patent No.: US 7,813,770 B2
(45) Date of Patent: *Oct. 12, 2010

(54) SPEAKER MODULE DESIGN

(75) Inventors: San-Chi Ho, Tao Yuan (TW); Kar-Chai Luk, Tao Yuan (TW); Teerada Sirirattanasit, Tao Yuan (TW)

(73) Assignee: HTC Corporation, Taoyuan County (TW)

(*) Notice: Subject to any disclaimer, the term of this patent is extended or adjusted under 35 U.S.C. 154(b) by 0 days.

This patent is subject to a terminal disclaimer.

(21) Appl. No.: 11/838,846

(22) Filed: Aug. 14, 2007

(65) Prior Publication Data

US 2007/0275769 A1    Nov. 29, 2007

Related U.S. Application Data

(63) Continuation of application No. 10/423,772, filed on Apr. 24, 2003, now Pat. No. 7,263,387.

(30) Foreign Application Priority Data

Jan. 21, 2003   (TW) ............................... 92201050 U

(51) Int. Cl.
*H04M 1/00* (2006.01)

(52) U.S. Cl. .................... 455/569.1; 381/345; 381/349; 381/351; 381/353; 381/354; 381/334; 381/335; 181/155; 181/156; 181/145; 181/183; 181/184; 379/433.02; 379/432

(58) Field of Classification Search ............... 455/569.1; 381/345, 349, 351, 353, 354, 334, 335, 348, 381/350; 181/155, 156, 145, 183, 184; 379/433.02, 379/432, 430

See application file for complete search history.

(56) References Cited

U.S. PATENT DOCUMENTS

| 4,783,820 | A * | 11/1988 | Lyngdorf et al. ............... 381/89 |
| 5,621,804 | A * | 4/1997 | Beppu ......................... 381/332 |
| 7,263,387 | B2 * | 8/2007 | Ho et al. ................... 455/569.1 |
| 2004/0203997 | A1 * | 10/2004 | Kaikuranta et al. ...... 455/550.1 |

* cited by examiner

Primary Examiner—Patrick N Edouard
Assistant Examiner—Justin Y Lee
(74) Attorney, Agent, or Firm—J.C. Patents

(57) ABSTRACT

A speaker module and a mobile device having the speaker module are provided herein. The speaker module includes a speaker unit and a speaker box. The speaker box has a wall defining an aperture receiving the speaker unit therein. The speaker box has a first speaker chamber, a second speaker chamber and a connecting section connecting the first speaker chamber and the second speaker chamber. The cross-sectional height of the space of the connecting section is lower than that of the first speaker chamber or the second speaker chamber. In other option, the space of the connecting section is smaller than that of the first speaker chamber or the second speaker chamber.

18 Claims, 2 Drawing Sheets

SPEAKER MODULE DESIGN

CROSS-REFERENCE TO RELATED APPLICATION

This is a continuation of patent application Ser. No. 10/423,772, filed on Apr. 24, 2003, which claims the priority benefit of Taiwan patent application serial no. 92201050, filed Jan. 21, 2003 and is now allowed. The entirety of each of the above-mentioned patent applications is hereby incorporated by reference herein and made a part of this specification.

BACKGROUND OF THE INVENTION

1. Field of Invention

The present invention relates to a speaker module design. More particularly, the present invention relates to a speaker module for a hand-held electronic device.

2. Description of Related Art

In this information age, our reliance on electronic products can be seen everywhere. For example, we use mobile phones, computers and audio-visual products every day. As manufacturing techniques for electronic devices continue to advance, more personalized and multi-functional electronic products are available in the market. With big leaps in the communication industry, the mobile phone is becoming increasingly common in our society.

Starting out bulky and heavy, the first generation of mobile phones has transformed into slim and lightweight palm-top phones. Yet, most manufacturers are still researching methods to reduce the weight and size of existing mobile phones for greater portability. In the meantime, manufacturers are also trying hard to expand the function of each mobile phone and reduce as much as possible any harmful effects due to electromagnetic radiation, however small they actually are. However, reducing the size of an existing mobile phone involves a close matching of all the elements within the mobile phone including the location and size of a speaker box for housing a speaker unit. In fact, quality of sound emitted from the phone largely depends on the size of the speaker box. In general, a larger speaker box can obtain a better sound quality. Nevertheless, due to the miniaturization trend of the hand-held electronic device, a speaker box has a large size is no longer practical. Hence, how to devise a speaker box that can improve the sound quality while does not need to increase in size is an important topic for manufacturers of hand-held electronic devices.

FIG. 1 is a cross-sectional view showing major components and an internal structure of a conventional speaker module 100 inside a mobile phone 10. As shown in FIG. 1, the conventional speaker module 100 is installed inside a casing 12 of the mobile phone 10. The speaker module 100 mainly includes a speaker unit 110 and a speaker box 120. The speaker box 120 houses the speaker unit 110. Aside from serving as a sound-producing loudspeaker, the speaker unit 110 also functions as a buzzer with specialized response at high frequency. Furthermore, the speaker unit 110 can also function as a receiver. Thus, the speaker unit 110 in the mobile phone 10 serves three major functions altogether. In addition, the wall at one end of the speaker box 120 has an aperture 120a that accommodates the speaker unit 110. A printed circuit board 14 within the mobile phone 10 also has a hole 14a for fittingly receiving the entire speaker box 120 inside the casing 12. Therefore, the speaker module 100 consisting of the speaker unit 110 and the speaker box 120 is able to generate sound in an amplified manner. In general, an additional antenna module 16 is also set up between the casing 12 and the speaker box 120 for receiving and transmitting signals of the mobile phone 10.

When the mobile phone 10 is reduced in size, the speaker box 120 within the phone must be reduced correspondingly. As a result, the low frequency response of the speaker module 100 will deteriorate. Moreover, the cost of producing a miniaturized speaker unit 110 capable of serving as a loudspeaker, a buzzer and a receiver is especially high. All in all, the cost of producing the mobile phone 10 will be increased.

SUMMARY OF THE INVENTION

The invention provides a speaker module, which includes a speaker unit; and a speaker box. The speaker box has a wall defining an aperture receiving the speaker unit therein. The speaker box has a first speaker chamber, a second speaker chamber and a connecting section connecting the first speaker chamber and the second speaker chamber. The cross-sectional height of the space of the connecting section is lower than that of the first speaker chamber or the second speaker chamber.

The invention provides a mobile device having a casing and a speaker module received in the casing. The speaker module comprises a speaker unit; and a speaker box having a wall defining an aperture receiving the speaker unit therein. The speaker box has a first speaker chamber, a second speaker chamber and a connecting section connecting the first speaker chamber and the second speaker chamber. The space of the connecting section is smaller than that of the first speaker chamber and the second speaker chamber.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate an embodiment of the invention and, together with the description, serve to explain the principles of the invention. In the drawings.

DESCRIPTION OF THE PREFERRED EMBODIMENT

Figure 1:
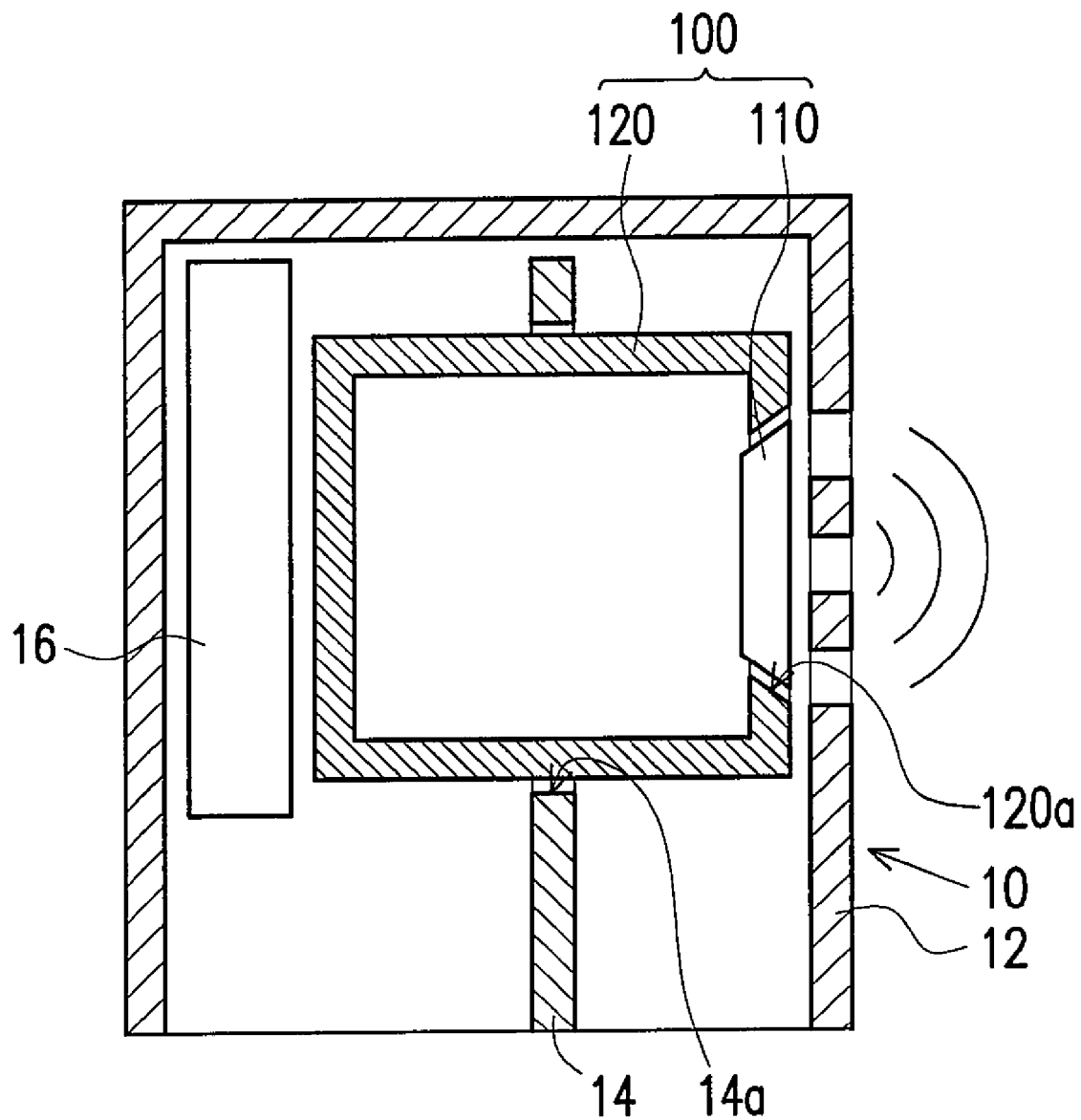
FIG. 1 is a cross-sectional view showing major components and an internal structure of a conventional speaker module inside a mobile phone.

Reference will now be made in detail to the present preferred embodiment of the invention, an example of which is illustrated in the accompanying drawing. Wherever possible, the same reference numbers are used in the drawings and the description to refer to the same or like parts.

Figure 2:
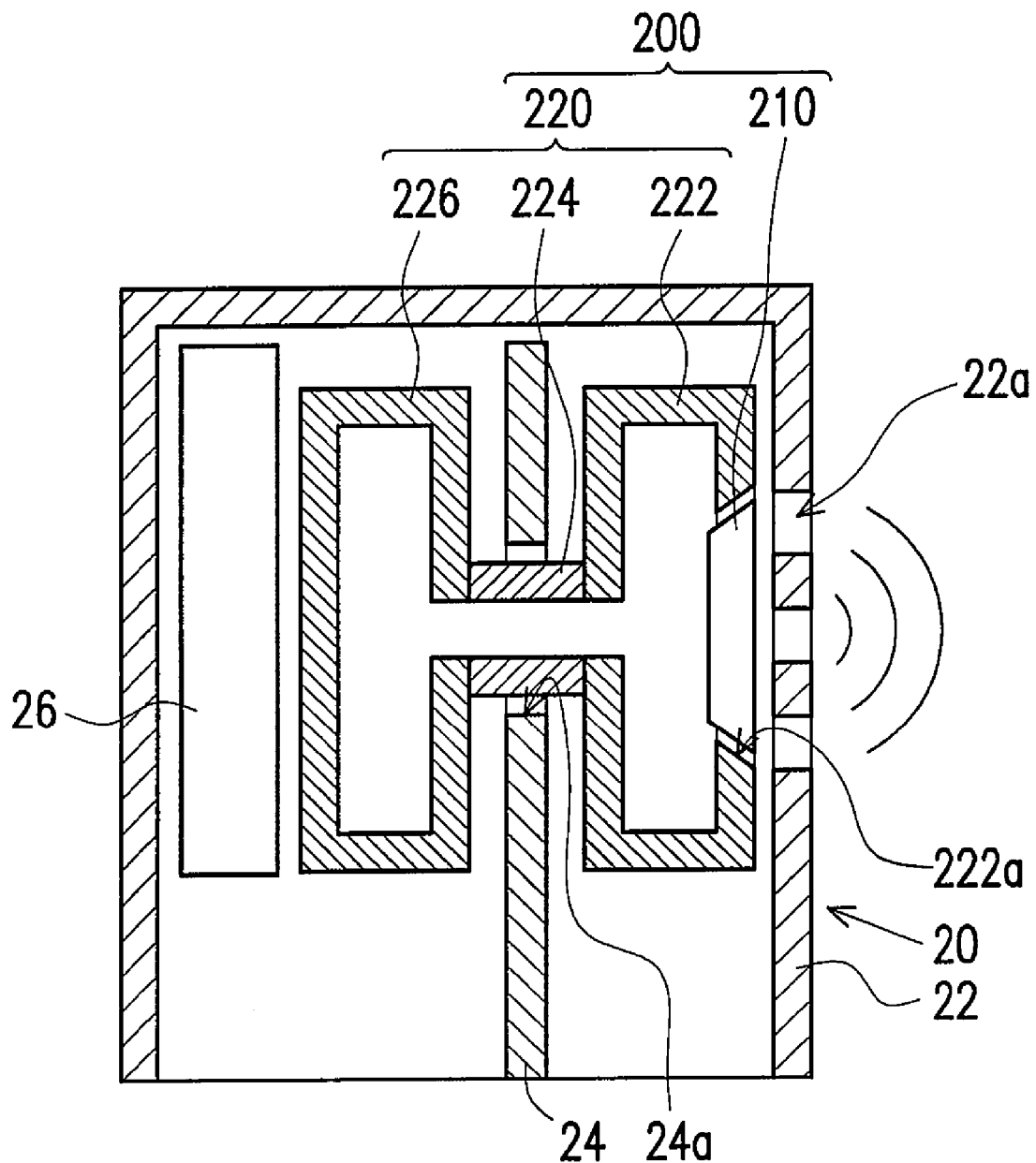
FIG. 2 is a cross-sectional view showing major components and an internal structure of a speaker module inside a mobile phone according to one preferred embodiment of this invention.

FIG. 2 is a cross-sectional view showing major components and an internal structure of a speaker module 200 inside a mobile phone 20 according to one preferred embodiment of this invention. As shown in FIG. 2, the speaker module 200 is enclosed within a casing 22 of the mobile phone 20. Aside from the mobile phone 20, the speaker module 200 may be installed inside a palm-top device such as a personal digital assistant (PDA) or a hand-held games console. The speaker module 200 mainly comprises a speaker unit 210 and a speaker box 220. Note that the mobile phone 20 normally has a printed circuit board 24 with a hole 24a for mounting the speaker box 220.

The speaker box 220 mainly includes a front speaker chamber 222, a neck section 224 and a rear speaker chamber 226. The front speaker chamber 222 has a front wall (not labeled) defining an aperture 222a therein. The speaker unit 210 is mounted into the aperture 222a. The neck section 224 is firstly brought to fit in the hole 24a of the printed circuit board 24. The front speaker chamber 222 and the rear speaker chamber 226 are then securely attached to front and rear ends (not labeled) of the neck section 224, respectively. In other words, the front speaker chamber 222 and the rear speaker chamber 226 are connected together through the neck section 224 and hence the overall volume of the speaker box 220 is the combined volume of the front speaker chamber 222, the neck section 224 and the rear speaker chamber 226. A combination of the printed circuit board 24 and the speaker module 200 is put into the casing 22. Thereafter, an antenna module 26 is also inserted in the casing 22 at a position behind the rear speaker chamber 226. The antenna module 26 is used for receiving and transmitting signals of the mobile phone 20. The casing 22 defines a plurality of holes 22a therein. The speaker unit 210 is located just behind these holes 22a after the speaker unit 210 is mounted in the casing 22 so that sound generated by the speaker unit 210 can easily transmit through the casing 22 via these holes 22a.

Since the speaker box 220 is a structure that includes two speaker chambers 222, 226 connected through the neck section 224, the front and rear speaker chambers 222, 226 can expand in a direction parallel to the printed circuit board 24 (expand vertically upward and downward according to FIG. 2) for increasing the volume of the speaker box 220 without increasing the size of the hole 24a. Because overall volume of the speaker box 220 is positively related to the low frequency response of the speaker module 200, the special design of the speaker box 220 is able to improve sound quality at low frequency. Therefore, by dividing the conventional speaker box into the two speaker chambers 222 and 226 linked by the neck section 224, the speaker box 220 can have sufficient volume to provide a required low frequency response, while the valuable estate of the printed circuit board 24 can be reserved for circuitry layout.

Furthermore, the provision of the neck section 224 of the speaker box 220 can improve the performance of high frequency output response of the speaker module 200.

To verify the improvement of high frequency response of the speaker module 200, a test is conducted. During the test, diameter and length of the neck section 224 are changed to obtain different results regarding the frequency of output sound and value of standard sound pressure level (ΔSPL). The testing parameters include: an input frequency ranging 100 hz~20 khz, the front speaker chamber 222 having a volume of 1.6 cc, the rear speaker chamber 226 having a volume of 4 cc, an input power to the speaker unit 210 rating 1 Watt and a distance between a reception point and the speaker unit 210 being 1 cm. A result of the test is listed in Table 1 below.

TABLE 1

| Diameter D (m) | Length L (m) | Maximum frequency f(Hz) | ΔSPL (dB) |
|---|---|---|---|
| 0.004 | 0.004 | 2175 | 17.54 |
|  | 0.005 | 2087 | 23.31 |

TABLE 1-continued

| Diameter D (m) | Length L (m) | Maximum frequency f(Hz) | ΔSPL (dB) |
|---|---|---|---|
|  | 0.006 | 2013 | 19.38 |
| 0.005 | 0.004 | 2450 | 14.62 |
|  | 0.005 | 2350 | 24.39 |
|  | 0.006 | 2267 | 18.93 |
| 0.006 | 0.004 | 2721 | 13.42 |
|  | 0.005 | 2610 | 23.71 |
|  | 0.006 | 2518 | 16.62 |

In this invention, the speaker module 200 uses a neck section 224 to connect front and rear speaker chambers 222, 226. By adjusting cross-sectional diameter D and length L of the neck section 224, the speaker module 200 can generate sound at the frequency ranging 2 k~3 kHz at a standard pressure level between 13.42~24.39 dB. Hence, performance of high frequency response achieved by the speaker module 220 is improved.

As shown in FIG. 2, one major characteristic of this invention is in the speaker box 220. The speaker box 220 has a neck section 224 located between and connecting the front and rear speaker chambers 222, 226. In other words, the neck section 224 of the speaker box 220 results from a narrowing of a peripheral wall of the speaker box 220. Note that the neck section 224 of the speaker box 220 is fitted in the hole 24a of the printed circuit board 24 so that the front and rear speaker chambers 222, 226 of the speaker box 220 are located in front and rear of the printed circuit board 24, respectively. This arrangement enables the hole 24a in the printed circuit board 24 needed to mount the speaker box 220 to be relatively small, and hence increases the circuit layout area of the printed circuit board 24.

In conclusion, the speaker module 200 of this invention includes at least the following advantages:

1. The speaker box 220 of the speaker module 200 has a neck section 224 linking up two speaker chambers 222, 226. The speaker box 220 is mounted to a printed circuit board 24 by fitting the neck portion 224 in a hole 24a of the printed circuit board 24. The speaker chambers 222, 226 are located on front and rear faces of the printed circuit board 24, respectively, so that they can expand in a direction parallel to the printed circuit board 24. By expanding the speaker chambers 222, 226 in a direction parallel to the printed circuit board 24, an overall volume of the speaker box 220 can be increased and low frequency response of the speaker module 200 can be improved, while an area of the hole 24a of the printed circuit board 24 for mounting the speaker box 220 does no need to increase.

2. The speaker module 200 utilizes the neck section 224 of the speaker box 220 to increase the high frequency response.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A handheld electronic device, comprising:
a casing;
a print circuit board; and
a speaker module coupled to the print circuit board within the casing, the speaker module comprising:
a speaker unit; and a speaker box having a wall defining an aperture receiving the speaker unit therein, a first speaker chamber, a second speaker chamber, and a communicating channel positioned between the first speaker chamber and the second speaker chamber, wherein the first speaker chamber has a first opening defined at one end of the communication channel, and the second speaker chamber has a second opening defined at the other end of the communicating channel, wherein the first speaker chamber communicates with the second speaker chamber through the communicating channel, wherein the speaker unit, the first speaker chamber, the second speaker chamber, and the communicating channel form an only enclosed space within the speaker box, and wherein the aperture is the only one aperture to acoustically communicate the speaker box with outside thereby.

2. The handheld electronic device of claim 1, wherein the space of the communicating channel is smaller than that of the first speaker chamber and the second speaker chamber.

3. The handheld electronic device of claim 1, wherein the communicating channel is a narrow-spaced channel.

4. The handheld electronic device of claim 1, wherein the wall having the aperture for receiving the speaker unit defines the first speaker chamber or the second speaker chamber.

5. The handheld electronic device of claim 1, further comprising an antenna module being disposed between the casing and the speaker box.

6. The handheld electronic device of claim 1, wherein the speaker box has a connecting section connecting the first speaker chamber and the second speaker chamber and defines the communicating channel.

7. The handheld electronic device of claim 1, wherein the first speaker chamber has a first inner wall having the first opening defined thereon, and the second speaker chamber has a second inner wall having the second opening defined thereon.

8. The handheld electronic device of claim 1, wherein the speaker unit leaves at least a certain room of the aperture unblocked, allowing a sound to transmit out from the speaker box therefrom.

9. The handheld electronic device of claim 1, wherein the print circuit board is positioned between the first chamber and the second chamber.

10. The handheld electronic device of claim 1, wherein the communicating channel is correspondingly positioned through an opening of the print circuit board.

11. The handheld electronic device of claim 1, wherein the print circuit board secures the communicating channel connecting the first chamber and the second chamber, so as to secure the speaker unit to the casing.

12. The handheld electronic device of claim 1, wherein the speaker box is substantially dumbbell shaped, and the communicating channel has a outer diameter smaller than that of the first speaker chamber and the second speaker chamber.

13. A handheld electronic device, comprising:
a casing;
a print circuit board; and
a speaker module coupled to and positioned through an opening of the print circuit board within the casing, the speaker module comprising:
a speaker unit; and
a speaker box having a wall defining an aperture receiving the speaker unit therein, a first speaker chamber, a second speaker chamber, and a communicating channel positioned between the first speaker chamber and the second speaker chamber, wherein the first speaker chamber has a first opening defined at one end of the communication channel, and the second speaker chamber has a second opening defined at the other end of the communicating channel, wherein the first speaker chamber communicates with the second speaker chamber through the communicating channel, and wherein the aperture is the only one aperture to acoustically communicate the speaker box with outside thereby.

14. The handheld electronic device of claim 13, wherein the wall having the aperture for receiving the speaker unit defines the first speaker chamber or the second speaker chamber.

15. The handheld electronic device of claim 13, further comprising an antenna module being disposed between the casing and the speaker box.

16. The handheld electronic device of claim 13, wherein the communicating channel is correspondingly positioned through the opening of the print circuit board.

17. The handheld electronic device of claim 13, wherein the print circuit board secures the communicating channel connecting the first chamber and the second chamber, so as to secure the speaker unit to the casing.

18. The handheld electronic device of claim 13, wherein the speaker box is substantially dumbbell shaped, and the communicating channel has a outer diameter smaller than that of the first speaker chamber and the second speaker chamber.

* * * * *